United States Patent Office 3,629,400
Patented Dec. 21, 1971

3,629,400
SLOW-RELEASE ADSORBED ALLERGENS
Edgar Relyveld and Emile Henoco, Paris, France, assignors to Institut Pasteur, Paris, France
No Drawing. Filed Sept. 20, 1968, Ser. No. 761,329
Claims priority, application France, Sept. 26, 1967, 122,285
Int. Cl. A61k 27/00
U.S. Cl. 424—91                                                                                9 Claims

ABSTRACT OF THE DISCLOSURE

Slow-release adsorbed allergen compositions are prepared by extracting an allergen from a powder which contains it, and adding alumina gel to its aqueous extract. More particularly, the extraction is made by means of a dibasic sodium phosphate solution; the allergen is precipitated by the addition of ammonium sulfate to the solution, it is separated from the solution and then redissolved in water containing dibasic sodium phosphate preferably at a concentration of about 0.05 M to 0.1 M. To the solution thus obtained aluminum hydroxide gel is added and the mixture is throughly stirred to form the stable adsorbed allergen composition.

---

The present invention relates to a process for the preparation of allergens adsorbed on aluminum hydroxide. Such products present a high and long-lasting therapeutic action, which allows one to reduce the number of injections and to inject high allergen quantities, when a desensitization treatment has to be effected.

The preparation of slow-release allergens includes several steps which are successively described hereinafter, on a specific but non-limitative example, of the allergens extracted from house dust. Same technique applies for obtaining other delayed-action allergens: microbial antigens, pollens extracts, feathers, hair, scales, wool, moulds, flour, kapok and so on. The preparation steps specially include: extracting, purifying, adsorbing allergen and testing the adsorbed preparation. The process also applies for the obtention of non purified slow-release allergen preparations, the various steps of the preparation being then applied, in the same conditions, to a raw extract.

Allergens are extracted by means of a solution of dibasic sodium phosphate ($Na_2HPO_4$), the concentration of which is usually 0.07 M. One or several successive extractions can be made. The time of contact for each extraction takes about 24 hours. Stirring is either periodically madt by hand or continuously by means of a mechanical device (stirrer, rotatory device, or other). The extraction is made at 37° C., at ordinary temperature or again in cold room. An antiseptic can be advantageously added in order to prevent microbial contaminations, for instance Merthiolate at a concentration of the order of 1/10,000. The allergenic extract is filtered through filter paper so that a clear solution be obtained. The residue is washed with the same above defined phosphate solution.

A fractionation of the extract is made by salting out with neutral salts, for instance with ammonium sulfate. The amounts of salt required for recovering the given sensitizing antigen are determined for each one allergen. Testing is carried out on sensitized subjects.

Purifying the dust is made for instance by first adding to the raw extract ⅓ of its volume of a netural and saturated ammonium sulfate solution. The mixture is allowed to stand one or several days and is then filtered. Ammonium sulfate crystals are now added to the filtrate until the solution is completely saturated. The precipitate it contains is collected by filtration, dissolved in a 0.07 M dibasic sodium phosphate solution, and filtered through paper.

The allergen containing filtrate is then dialysed, first against tap-water, and then against distilled water. Subsequently 9 g. of sodium chloride and 100 g. of Merthiolate are added per litre of the dialysed solution. The solution thus obtained is then filtered through Seitz type or other sterilizing filter.

The nitrogen content in the extract is determined and dilutions are performed by means of a Merthiolate containing sodium chloride solution and aluminum hydroxide gel, in order to make solutions containing for instance: 10; 1; 0.1 etc. nitrogen micrograms by ml., corresponding to 1,000, 100, 10 etc. units per ml. of dust extract (noon units). Two types of preparations are made parallelly at the same concentrations:

(1) liquid preparations; (2) adsorbed preparations.

Liquid preparations are used for testing and sensibility of sick people and for determining the adsorbency degree of slow-release preparations.

Adsorbed preparations are obtained by adding to a determined quantity of diluted preparation a calculated volume of sterile aluminum hydroxide gel, usually about 4 mg. aluminum hydroxide per ml. of end product.

The aluminum hydroxide gel used is prepared in accordance with the Hansen and Schmidt process (Org. mond. Santé. Ser. Rapp. techn. 1953, 61, page 68). Of course, aluminum hydroxide gels obtained by similar processes may be used in the same conditions. All handlings are carried out in sterile conditions. On the other hand, innocuity and sterility usual checkings are performed on the preparations thus obtained. The adsorbancy determination is made by giving sensitized subjects the following injections:

(1) supernatant liquids obtained by centrifuging the adsorbed preparations;

(2) liquid preparations at the same concentrations.

When a postve reaction is obtained with one of the liquid preparations, it must be negative or only slightly positive for the supernatant portions of the corresponding adsorbed preparation. The following example illustrates the present invention without however limiting its scope. 10 kg. of sifted house dust are contacted with 24 litres of a 0.07 M $Na_2HPO_4$ solution a whole day. The mixture is stirred at regular intervals and filtered through paper. The precipitate is then washed by adding again 10 l. of the phosphate solution. The filtrates are gathered. A first precipitation is made by adding to 24.34 litres of the filtrate 8.113 litres of saturated ammonium sulfate solution. The filtrate obtained after 48 hours contact at 0° C. is saturated with crystallized ammonium sulfate. The precipitate which has formed after 24 hours standing at 0° C. is collected by filtration, dissolved in the phosphate solution and filtered. The solution thus obtained is dialysed first against tap-water, then against distilled water. The dialysed liquid is then completed to 5 litres with distilled water after the addition of 45 g. sodium chloride and 500 mg. thimerosal. The solution is sterilized by filtration through Seitz type discs; its nitrogen content is 0.281 mg. by ml. The following dilutions are prepared:

(1) Purified adsorbed dust of 1000 units per ml.

| | Ml. |
|---|---|
| Purified dust (solution I) | 400 |
| 9% sodium chloride solution having 1/10,000 of Merthiolate (solution II) | 8,600 |
| Gel containing 2% aluminum hydroxide (Al gel) | 2,240 |

(2) Purified adsorbed dust of 100 units per ml.

| | |
|---|---|
| Solution I | 40 |
| Solution II | 8,960 |
| Al gel | 2,240 |

(3) Purified adsorbed dust of 10 units per ml.

| | |
|---|---|
| Solution I | 4 |
| Solution II | 8,996 |
| Al gel | 2,240 |

(4) Fluid purified dust of 1000 units per ml.

| | |
|---|---|
| Solution I | 400 |
| Solution II | 10,840 |

(5) Fluid purified dust of 100 units per ml.

| | |
|---|---|
| Solution I | 40 |
| Solution II | 11,200 |

(6) Fluid purified dust of 10 units per ml.

| | |
|---|---|
| Solution I | 4 |
| Solution II | 11,236 |

The adsorption has been ascertained after the centrifugation of the adsorbed preparations and injection of 0.1 ml. to sensitized subjects. The results obtained show that the adsorption of the extract on aluminum hydroxide is almost total.

We claim:

1. Method for the preparation of a slow-release allergen by aqueous extraction from a powder which contains an allergen, which consists in first precipitating the allergen from its solution by adding a neutral salt, and separating the precipitate formed, then dissolving it again in water, and adding an alumina gel to its solution.

2. Method according to claim 1, wherein the extraction is carried out by means of a dibasic sodium phosphate aqueous solution, the preferred concentration of which is 0.05 M to 0.1 M.

3. Method according to claim 1, characterized in that the allergen precipitation is carried out by adding ammonium sulfate and allowing the mixture thus formed to stand at a temperature neighbouring 0° or equal to 0° C.

4. Method according to claim 1 wherein the alumina gel is an aqueous gel having about 2% by weight of aluminum hydroxide 5 to 600 volumes of which are added per volume of the allergen solution.

5. Method according to claim 1, wherein the precipitate is dissolved again in a dibasic sodium phosphate solution, the preferred concentration of which is 0.05 M to 0.1 M.

6. Method according to claim 5, characterized in that the solution in the dibasic sodium phosphate solution is dialysed against water.

7. Method according to claim 1, wherein the end solution of the allergen, prior to the addition of alumina gel, is added with sodium chloride and an antiseptic.

8. Method according to claim 7, wherein the amount of added alumina gel is such that the resulting mixture has an aluminum hydroxide content of about 4 mg. per ml.

9. A method as claimed in claim 7, wherein the antiseptic is thimerosal.

No references cited.

RICHARD L. HUFF, Primary Examiner